United States Patent [19]

DeGrow et al.

[11] Patent Number: 5,274,216
[45] Date of Patent: Dec. 28, 1993

[54] FOOD RETHERMALIZING AND SATELLITING TRAY

[75] Inventors: Gary C. DeGrow, Antioch; W. Burk Wyatt; Milton E. Smith, both of Brentwood; Julia T. Wimpee, Smyrna; Kevin B. Cundiff, Brentwood, all of Tenn.

[73] Assignee: Aladdin Synergetics, Inc., Nashville, Tenn.

[21] Appl. No.: 541,129

[22] Filed: Jun. 20, 1990

Related U.S. Application Data

[63] Continuation-in-part of Ser. No. 394,204, Aug. 15, 1989, and a continuation-in-part of Ser. No. 471,483, Jan. 29, 1990.

[51] Int. Cl.⁵ .................................. F25B 13/00
[52] U.S. Cl. .................................. 219/386; 219/518; 165/918
[58] Field of Search ............... 219/385, 386, 387, 521, 219/214, 518; 99/331, 325, 468; 165/918, 919; 126/246, 268; 312/236

[56] References Cited

U.S. PATENT DOCUMENTS

| | | | |
|---|---|---|---|
| 924,209 | 6/1909 | Wolfer | 220/23.4 |
| 1,786,141 | 12/1930 | Wilson | 220/17 X |
| 2,492,081 | 12/1949 | Williams | 214/1 |
| 3,122,265 | 2/1964 | Innis | 220/97 |
| 3,240,610 | 8/1966 | Cease | 220/2.34 X |
| 3,275,393 | 9/1966 | Stentz | 219/386 |
| 3,385,952 | 5/1968 | Mix | 219/387 |
| 3,387,650 | 6/1968 | Hoffmann et al. | 62/371 X |
| 3,408,481 | 10/1968 | Golden | 219/386 |
| 3,532,247 | 10/1970 | Bridges | 220/23.6 |
| 3,654,853 | 4/1972 | Fayling . | |
| 3,750,083 | 7/1973 | Fayling . | |
| 3,754,640 | 8/1973 | Bridges . | |
| 3,799,143 | 3/1974 | Bridges | 219/385 |
| 3,842,724 | 10/1974 | Korr et al. | 99/332 |
| 3,965,969 | 6/1976 | Williamson | 219/386 |
| 3,974,358 | 8/1976 | Goltsos | 219/385 |
| 4,005,745 | 2/1977 | Colato et al. . | |
| 4,103,736 | 8/1978 | Colato et al. . | |
| 4,126,775 | 11/1978 | Wyatt | 219/386 |
| 4,203,486 | 5/1980 | Rubbright et al. . | |
| 4,285,391 | 8/1981 | Bourner | 219/386 |
| 4,323,110 | 4/1982 | Rubbright et al. . | |
| 4,346,756 | 8/1982 | Dodd et al. . | |
| 4,523,083 | 6/1985 | Hamilton | 219/432 |
| 5,003,159 | 3/1991 | Thorson | 219/386 |

FOREIGN PATENT DOCUMENTS

| | | |
|---|---|---|
| 2285836 | 7/1975 | France . |
| 0024992 | 3/1981 | France . |
| 9006075 | 6/1990 | World Int. Prop. O. . |

OTHER PUBLICATIONS

Counselor, vol. 10, Issue 1, 1988.

Primary Examiner—Bruce A. Reynolds
Assistant Examiner—John A. Jeffery
Attorney, Agent, or Firm—Banner, Birch, McKie & Beckett

[57] ABSTRACT

A food service rethermalization process including a tray having first and second receiving hot dish receiving areas, at least one cold dish receiving area and an end wing area for holding eating utensils, napkins and the like. First and second selector or actuator knobs are mounted in the tray adjacent to the first and second hot dish receiving areas, respectively, and can be separately turned to on or off positions. When the tray is inserted in a rethermalization cart and the first and second heating pods of the cart are at the first and second areas respectively, the heating pods whose associated knobs are in the "on" position are switched on and the food at the associated areas thereby heated in a programmed manner. After the knobs have been turned as needed and before the tray is inserted in the cart, an over-all insulated cover is secured to and on top of the tray. The cover thermally separates and covers the different areas including the wing area. It thereby covers, insulates and protects each of the areas allowing the loaded tray to be safely transported outdoors to a remote building or other location.

75 Claims, 15 Drawing Sheets

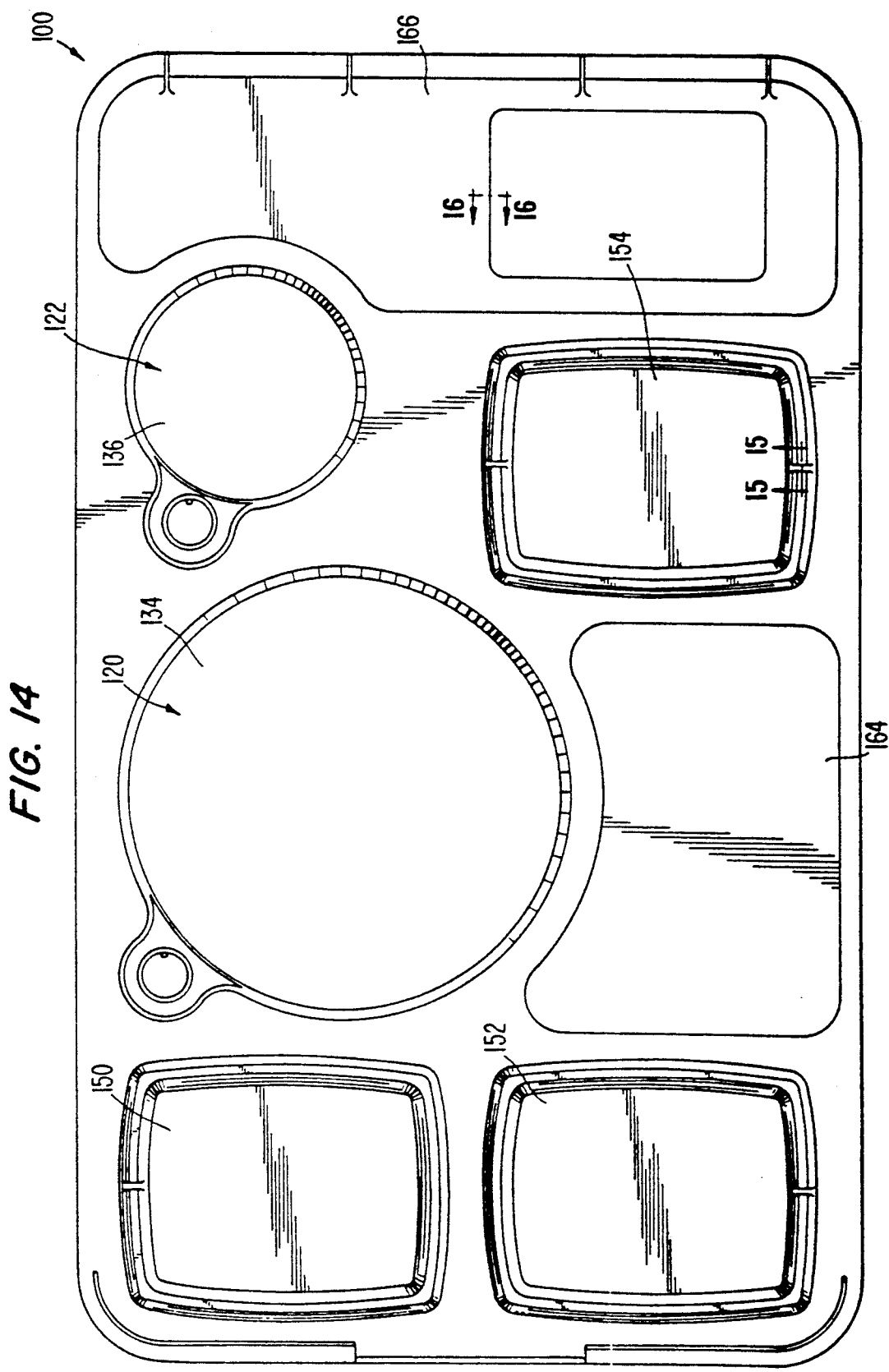

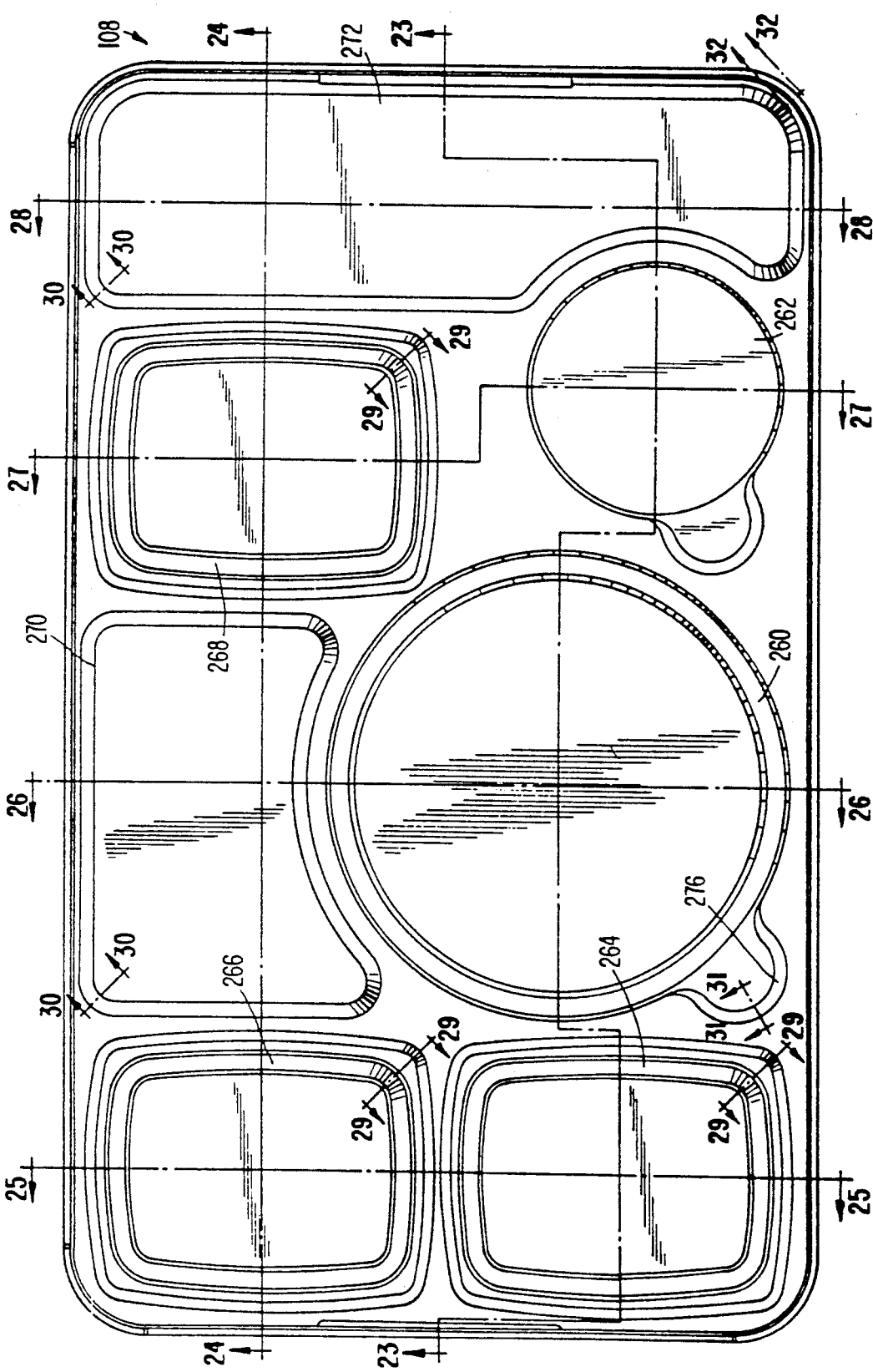

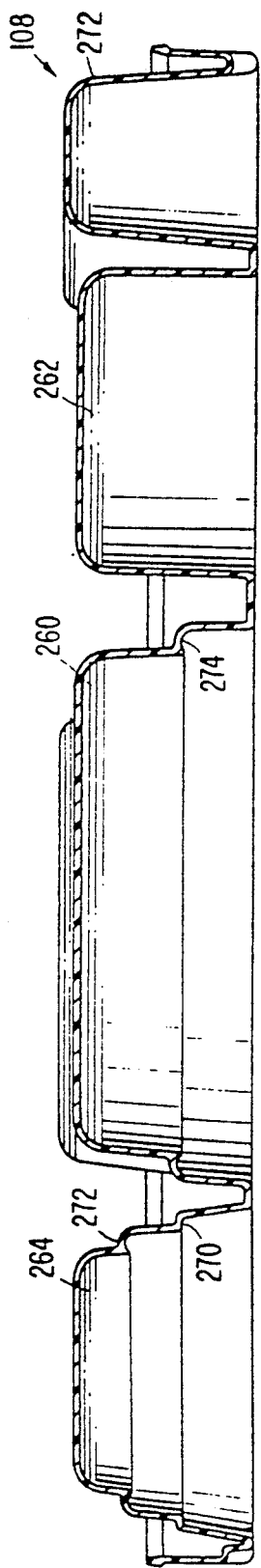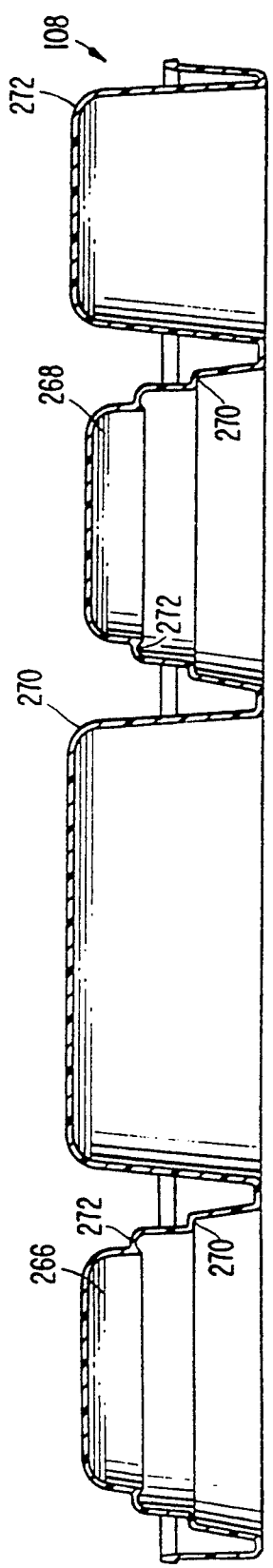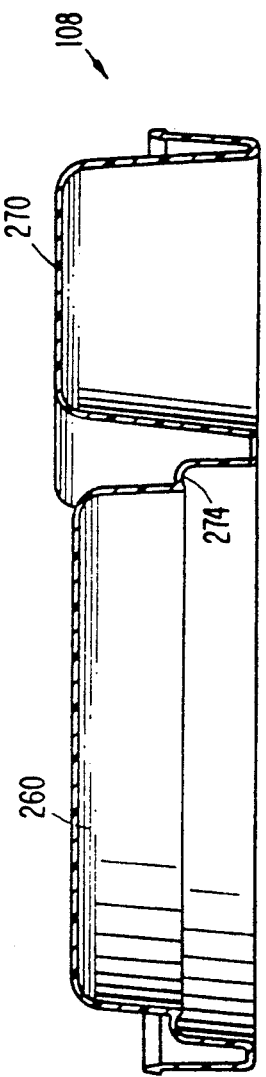

FOOD RETHERMALIZING AND SATELLITING TRAY

CROSS-REFERENCE TO RELATED APPLICATIONS

This is a continuation-in-part of copending application Ser. No. 07/394,204 ('204), filed Aug. 15, 1989, and copending application Ser. No. 07/471,483 ('483), filed Jan. 29, 1990, and which in turn is a division of the '204 application. These applications and any other applications, patents or other publications mentioned anywhere in this disclosure are hereby incorporated by reference in their entireties.

BACKGROUND OF THE INVENTION

The present invention relates to food service systems wherein individual portions of precooked food are supported on trays within movable carts. The carts are placed in a chilled environment to store the food in a chilled state. Selected foods on the trays are rethermalized in the cart or heated to a hot serving temperature, while other portions of the foods on the trays remain in the chilled state. The present invention more particularly pertains to trays which can be used in such rethermalization systems and are particularly adapted to use in satelliting systems, wherein the trays after rethermalization are transported to another building or other remote location, and often via the outdoors.

A rethermalization system is a prior art food service system wherein food is cooked or precooked and then chilled in bulk to 40° F. or less. The food is divided into individual portions and stored in a chilled state until it is reheated. The United States Food and Drug Administration (FDA) guidelines specify that the chilled and stored temperature must be 40° F. or less. A short time before the food is served, the food which is to be served hot is brought to a safe serving temperature, that is, it is rethermalized. FDA guideline specify that a safe serving temperature is 165° F. or greater.

One known rethermalization concept is the Temp-Rite II System available from Aladdin Synergeties, Inc. of Nashville, Tenn., and as disclosed at least in part in U.S. Pat. No. 4,285,391 to Bourner, The Temp-Rite II System uses three separate thermostatically controlled heaters on each cart shelf whereby each heater supplies a particular wattage depending upon the type of food to be heated, extensity and the dishware used. The Temp-Rite II tray has insulated compartments each insulated from the others. In addition, a compartmentalized insulated cover is placed over the food compartments thereby isolating the hot areas from the cool areas. This insulated cover allows the tray to be moved in a satelliting operation or from one building to another while protecting the various foods from temperature change, wind, dust and the like.

After the tray is assembled on a cold tray line, and then protected by the insulated cover, the assembled trays are placed on the cart shelves. The shelves can be placed on the cart at one position or at a 180° reverse position. In the first position, the three hot food compartments align precisely with three heating elements and the cover automatically engages an activator switch mounted on the side of the cart for future heating. If the tray is placed in the reverse position, however, the three hot compartments will not be positioned over the heating elements and the cover will not engage the activator switch. As a result, all the food on the shelf remains cold. The loaded carts are then rolled into a rethermalization refrigerator where the meals are held at 40° F. The activator switch turns the three elements either on or off and does not individually control any one heating element. The dishware of this tray are rectangular rather than the more conventional and aesthetically pleasing round shape.

Another very recent system is the Temp-Rite II Excel System also available from Aladdin and disclosed at least in part in the '204 application. It is basically a cafeteria pellet system which utilizes two round hot dishes having separate insulated covers or domes. Rather than having a server design which is entirely compartmentalized, several dishes on the server can be repositioned on a flat tray surface at the convenience of the user. Since separate insulated domes are used for each hot food dish, a dome is removed only when the particular food will be eaten. Although an overall cover covers the dishware for sanitation reasons, this cover need not be insulated because the needed insulation is provided by the individual insulated domes. This system also includes a unique separate heating pod arrangement. Each pod is a modular unit and thus can be replaced if necessary without replacing the other pods on the same tray extrusion. Each pod further incorporates two circuits—a low wattage primary and a higher wattage secondary which allow for the heating over a wider range in the combination of different food densities. A dome sensing magnetic switch determines the presence or absence of the insulated dome over the pod. If the dome is present the pod will be activated to permit heating of the food at the desired time. In the event the operator wants to keep certain foods cold, the dome can be removed for preventing activation of the pod.

Other examples of food service rethermalization systems wherein the heating elements are incorporated into shelves within the service cart are shown in U.S. Pat. Nos. 4,346,756 to Dodd et al. and 4,323,110 to Rubbright et al.

SUMMARY OF THE INVENTION

A need has arisen though for a new type of rethermalization system. This system would include at least two tray locations for hot food dishes, at least one location for securely retaining a cold food dish, and a wing area for retaining silverware, napkins and the like. This system should have the flexibility, however, to individually control the heating of the hot food dishes, that is, to allow one or both of the hot food dishes to not be heated during the rethermalization process, as they might support a cold entree or a cold soup for example. The system should be simple enough to use so that all service people can easily learn to use it. They should be able to readily tell whether the proper food areas were heated. This system should further be adapted to satelliting operations where the rethermalized trays must be transported to remote locations while protecting the contents of the tray from contamination from wind, dust and the like and while keeping the foods for as long a time as possible in their chilled or reheated conditions. The tray/cover unit should be able to stack easily and securely one on top of the other, and the dishes and other contents of the unit should be secured therein in position so to not slide freely about during transport.

Directed to achieving these objects, an improved rethermalization and satelliting system and tray therefor are herein provided. The tray is formed of plastic with a large and a smaller hole or opening therethrough. The holes are round and a lip surrounds them to support a large or entree hot food dish in the first hole and a smaller hot food or soup dish in the second hole. Three recessed-in support areas are provided also on the top surface of the tray for retaining therein three cold food dishes. A tray recessed area also is positioned above the entree opening and between two of the cold food areas for placement of cartons of drinks and the like. A recessed wing area extends the length of the right end of the tray for silverware, napkins and the like. No separate domes are used for the hot food dishes. Rather, an insulated cover lock fits over the entire tray including the wing portion thereof to protectively enclose the tray and its contents, protect them from dust and wind blowing during a satelliting operation and also thermally separating the foods and keeping them at their desired cool or hot temperatures for long periods of time.

This tray is designed for use in the previously-described Excel cart. In the Excel System the food service carts have a plurality of shelf locations each for a separate tray and having a pair of cantilivered heating pods. These heating pods are designed to align with the openings of the tray when the tray is in an inserted cart position. Each pod is controlled by its own magnetically operated on-off switch. The actuator means for these switches in the present invention is advantageously provided on the surface of the tray and is an integral part thereof. These actuators comprise first and second knobs mounted in the trays adjacent the larger and smaller hot food openings, respectively. The knobs can be easily turned between off and on positions thereby aligning their metallic plugs for activation of these switches. Thus the activation and heating operations of both of the pods are individually controlled. Further their operation and setting can be easily seen by looking at the knob position. The layout of the tray is particular well suited and designed to accommodate nearly all conventional meals.

Other objects and advantages of the present invention will become more apparent to those of ordinary skill in the art from the foregoing description taken in conjunction with accompanying drawings.

BRIEF DESCRIPTION OF THE DRAWINGS

FIG. 14 is a bottom plan view of the tray of FIG. 13.

FIG. 22 is a top plan view of the bottom shell of the cover for the system of FIG. 1.

FIG. 23 is a cross-sectional view taken along line 23—23 of FIG. 22.

FIG. 24 is a cross-sectional view taken along line 24—24 of FIG. 22.

FIG. 26 is a cross-sectional view taken along line 26—26 of FIG. 22.

DETAILED DESCRIPTION OF PREFERRED EMBODIMENTS OF THE PRESENT INVENTION

Figure 12:
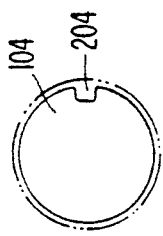
FIG. 12 is a top plan view of either of the knob mounting rings and projections of the tray of FIGS. 1 and 11.
Figure 13:
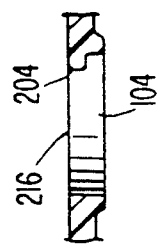
FIG. 13 is an enlarged cross-sectional view of the knob ring of FIG. 12.
Figure 10:
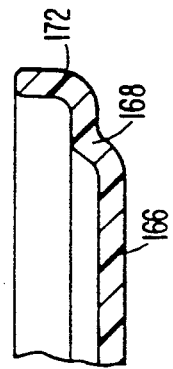
FIG. 10 is a cross-sectional view taken along line 10—10 of FIG. 1.
Figure 11:
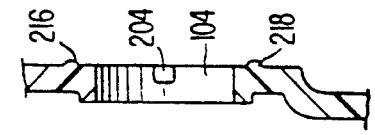
FIG. 11 is a cross-sectional view taken along lines 11—11 of FIG. 1.

Referring to the drawings, wherein like numerals indicate like elements, there is illustrated in isolation different components of a food rethermalization and satelliting tray system of the present invention. The tray system is composed of a number of elements including the bottom support tray as shown in FIGS. 1-16 generally at 100, the actuating or selector knob as shown in FIGS. 17-21 generally at 102 for mounting in either of openings 104 or 106 in the tray of FIG. 1 which openings are illustrated in greater detail FIGS. 11-13, a top cover bottom shell as shown in FIGS. 22-32 generally at 108, and a cover top shell as shown generally at 110 in FIGS. 33-42. The cover is constructed according to the process as disclosed in application Ser. No. 07/357,269, filed May 26, 1989, now U.S. Pat. No. 4,982,722. Briefly, the two cover shells 108, 110 are connected by a snap-fit interlocking joint (see FIG. 41) that is locked into place by expanding insulating foam (not shown) injected therebetween. The shells 108, 100 can thus be assembled quickly and securely together and without chemical adhesives.

Figure 1:
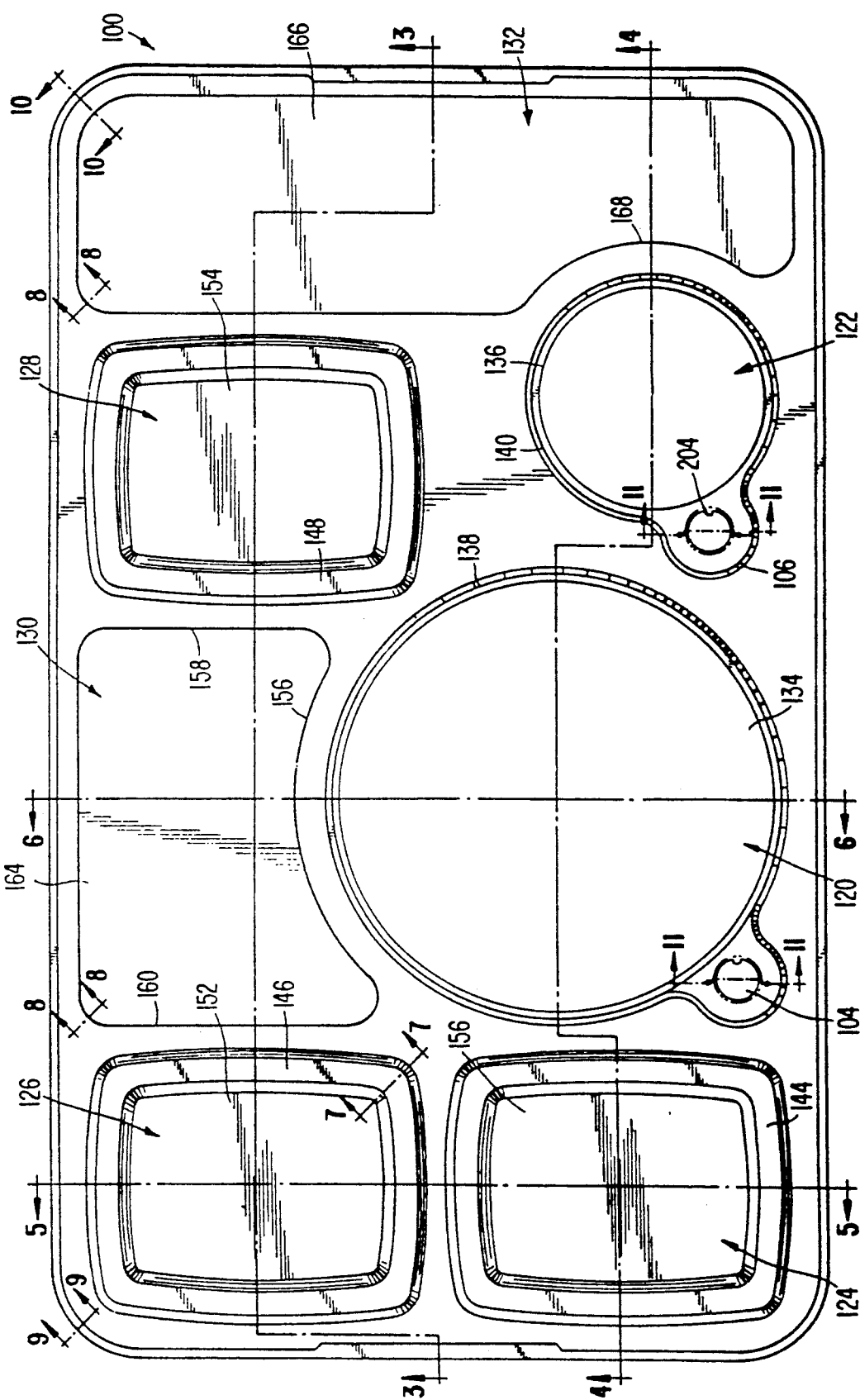
FIG. 1 is a top plan view of a tray of the present system invention.
Figure 2:
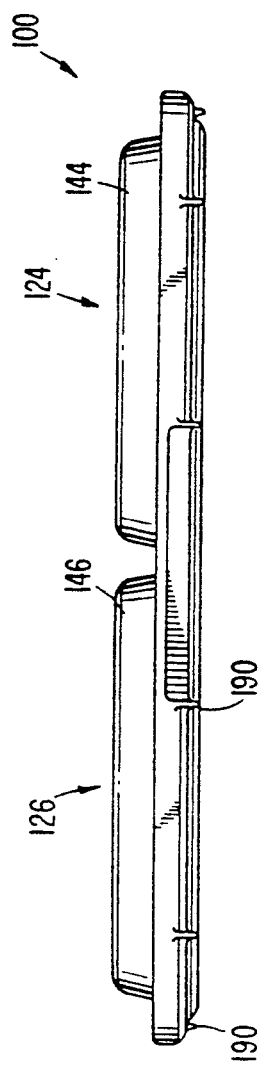
FIG. 2 is a left elevational view of the tray of FIG. 1.

The support tray 100 is showed in top view in FIG. 1 which best depicts the layout of the different tray areas. The tray 100 is preferably made of polysulphone alloy material in an injection molding process. The different tray areas have their outer boundaries defined by edges of openings through the plastic tray, or outlined by outstanding ribs, or by recessed-down walls, as will be explained. The various areas are a large hot plate area shown generally at 120, a smaller hot plate area shown generally at 122, first, second and third cold plate support areas shown at 124, 126 and 128, respectively, a top holding area 130, and a right end wing area 132.

Figure 4:
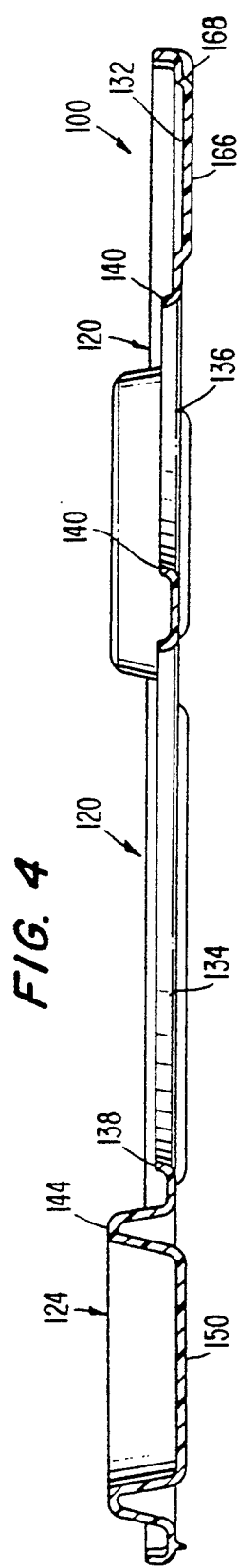
FIG. 4 is a cross-sectional view taken along line 4—4 of FIG. 1.
Figure 6:
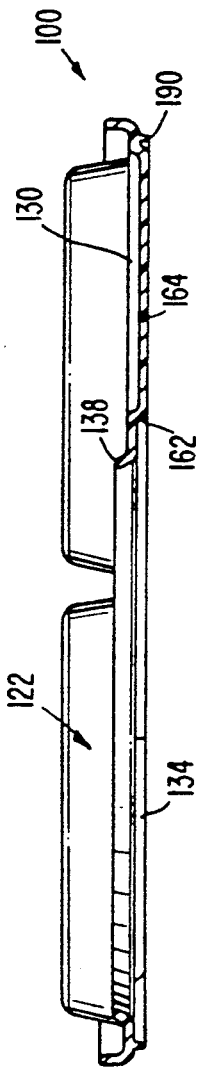
FIG. 6 is a cross-sectional view taken along line 6—6 of FIG. 1.
Figure 9:
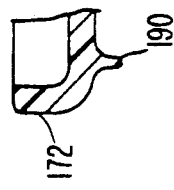
FIG. 9 is a cross-sectional view taken along line 9—9 of FIG. 1.
Figure 8:
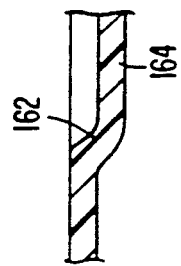
FIG. 8 is a cross-sectional view taken along line 8—8 of FIG. 1.

Both of the hot dish openings 134 and 136 for areas 120 and 122, respectively, define through-holes such that hot food dishes as described for example in the '483 division application can be inserted therein and held by the dish rims 138, 140 on the outer edges of the hot dish openings as shown in FIGS. 4 and 6, for example. With the large and small hot plate dishes (not shown) in place in these two openings 134, 136 and the tray 100 covered by the cover and inserted into a shelf location in a rethermalization cart (as shown in the '204 application), the bottoms of the dishes will rest on top of the heating surfaces of the heating pods (not shown herein but shown and described in detail in the '204 application) of the cart. The actuation of the on and off switches in the pods is controlled by the prior settings of the actuator knobs 102, as will be described later in detail.

Figure 3:
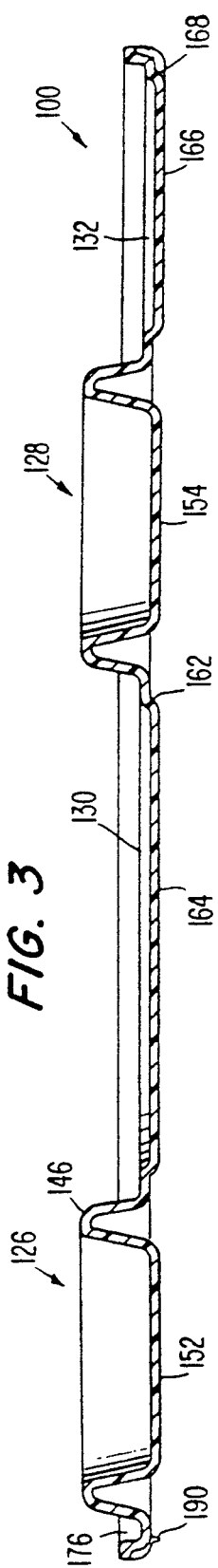
FIG. 3 is a cross-sectional view taken along line 3—3 of FIG. 1.
Figure 5:
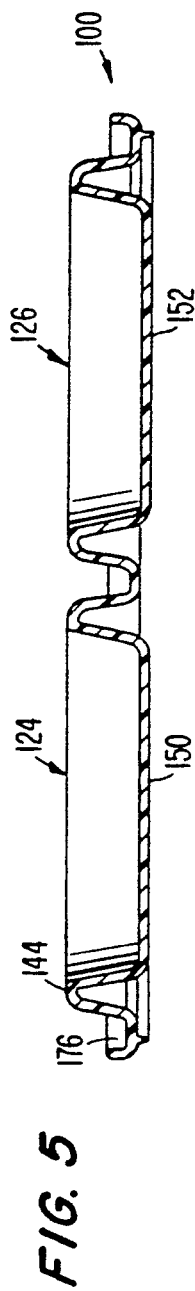
FIG. 5 is a cross-sectional view taken along line 5—5 of FIG. 1.
Figure 7:
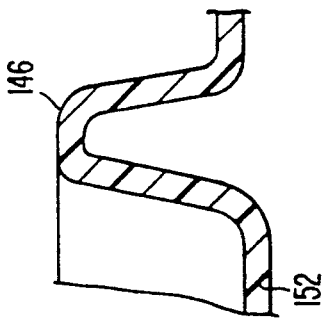
FIG. 7 is a cross-sectional view taken along line 7—7 of FIG. 1.

Smooth curved rims 144, 146, 148 define the outer boundaries of each of the cold tray or dish areas 124, 126, 128, respectively, as shown in FIGS. 3, 4 and 5. The curvature and configuration of these rims is best illustrated in FIG. 7. As is also apparent from these figures the inner support surfaces 150, 152, 154, respectively, are continuous within and circled by their respective rims. Both of the hot dish areas 120, 122 are circular to accommodate today's popular round entree and soup dishes (not shown). In contrast, the cold dish areas 124, 126, 128 are generally rectangularly configured with rounded corners and slightly outwardly bowing sides to accommodate a similar rectangular type of dish (not shown). The top holding area 130 has its inward perimeter portion 156 (FIG. 1) arcuately configured to be concentric with the adjacent arc of the large hot plate area 120. The right side 158 is also slightly shorter than the left side 160. But otherwise area 130 defines a rectangular type of configuration with rounded corners. As can be understood from FIGS. 3, 6 and 8, it is recessed down a slight distance by wall 162 to holding surface 164 from the adjacent surfaces of the tray 100. It is thus configured to define and conveniently hold articles such as cartons of milk (not shown).

Similarly, the right end wing area 132 has its support area 166 recessed down by wall 168 from the adjacent tray surfaces as can be understood from FIGS. 3, 4, 8 and 10 for example. It also has a basically narrow rectangular shape with rounded corners, except that the lower left corner, as shown in FIG. 1, has a cut-out portion 168 defining an arc concentric with the outer arc of the smaller hot plate area 122. The wing area 132 can hold silverware, napkins, small condiments and the like (not shown). The layout and design of the different areas of the tray 100, as best shown in FIG. 1, thus provide an effective use of the entire tray surface with each of the food service dishes and other items positioned in convenient and traditional serving positions. This tray 100 can handle a wide variety of meals to accommodate different peoples and diets.

Figure 15:
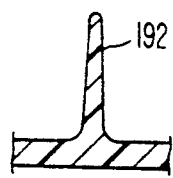
FIG. 15 is a cross-sectional view taken along line 15—15 of FIG. 14.
Figure 16:
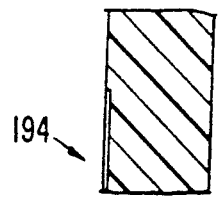
FIG. 16 is a cross-sectional view taken along line 16—16 of FIG. 14.
Figure 17:
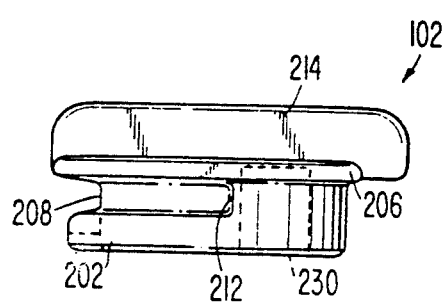
FIG. 17 is a front elevational view of the selector knob of the tray of FIG. 18 and illustrated in isolation.
Figure 18:
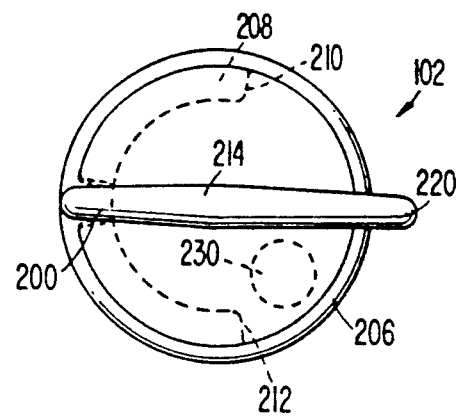
FIG. 18 is a top plan view of the knob of FIG. 17.

An upright wall 172 extends upright from the circumference of the tray 100, as is shown in numerous drawings including FIGS. 3, 6, 9 and 10. This upright wall 172 defines a lip onto which the top cover locks about the entire perimeter of the tray 100, protectively enclosing the entire tray to separately cover each of the areas of the tray to keep them warm or cold as needed and to insure that its contents are not contaminated by dust, leaves or the like which may be blown onto them during a satelliting or transporting operation. They also protect them from being blown or knocked off of the tray. The cover uniquely securely covers the wing area 132 thereby making this tray system especially useful in satelliting procedures. The inside surface of the cover extends down at different locations to engage the surfaces of the tray between each one of the tray support components and thereby to encircle the components and form the upper dome of an insulation chamber for each of them. The cover as shown in FIGS. 23-27 for example fits into the grooves or channels 176 as shown in FIG. 5 for example. Ribs or nibs 190 (or elongated ridges) extend down from the rim as can be seen in FIGS. 2, 3, 4, 5, 6, 9, and 14. The top of the cover fits in the nibs 190 when stacked. FIG. 15 shows a stacking rib 192 which makes the tray on tray sit level for shipping and storage. FIG. 16 in turn shows a logo recess area 194.

The actuating knob 102 is shown in isolation in FIGS. 18-21. It fits into one of the openings 104, 106 and a separate similar knob is provided for the other opening as shown in FIGS. 1, 11, 12 and 13. The knob 102 fits into this opening 104 or 106 down through the top of the tray 100 and with the cut-out area 200 in the base or bottom disk 202 of the knob aligned with and fitting into the projection 204 (FIGS. 11-13) in the tray opening. With the knob 102 in its fully inserted position the projection 204 will rest on the top disk 206 of the knob 102 and be able to ride in the arcuate channeled groove 208 extending approximately one hundred and eighty degrees around the lower disk 202 and with lower disk abutment portions 210, 212 at either end thereof. Thus, by grasping between the thumb and the forefinger the longitudinal rib 214, which is secured to and forms a part of the top disk 206, the knob 102 can be twisted ninety degrees, from the switch insertion position, in either direction past abutment nibs or stops 216, 218 (FIG. 11) on the top of the tray 100 and which the projection end 220 of the rib 214 runs over and stops against the end of the channel. The nibs 216, 218 then define the inward ends of the two outward positions of the projection end 220.

Figure 19:
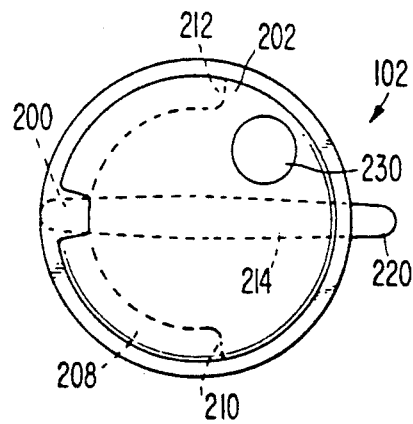
FIG. 19 is a bottom plan view of the knob of FIG. 17.
Figure 20:
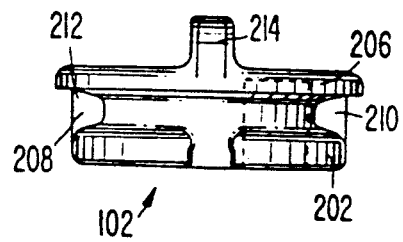
FIG. 20 is a left elevational view of the knob of FIG. 17.
Figure 21:
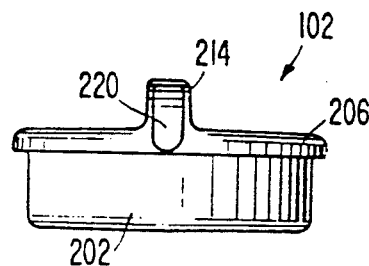
FIG. 21 is a right elevational view of the knob of FIG. 17.
Figure 25:
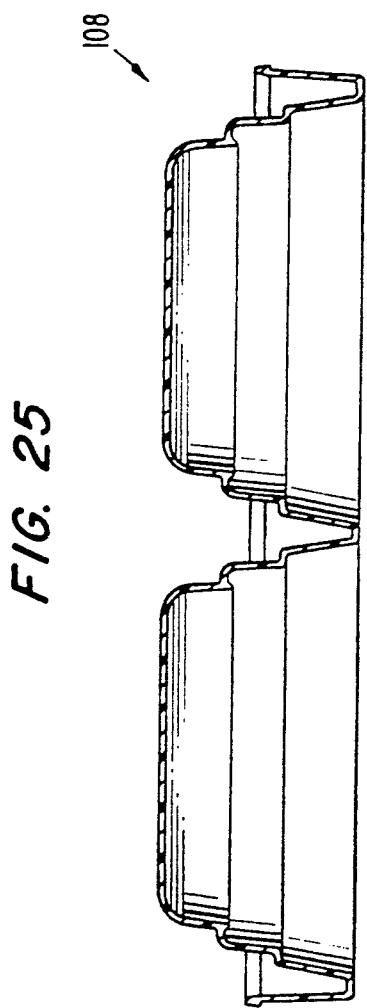
FIG. 25 is a cross-sectional view taken along line 25—25 of FIG. 22.
Figure 27:
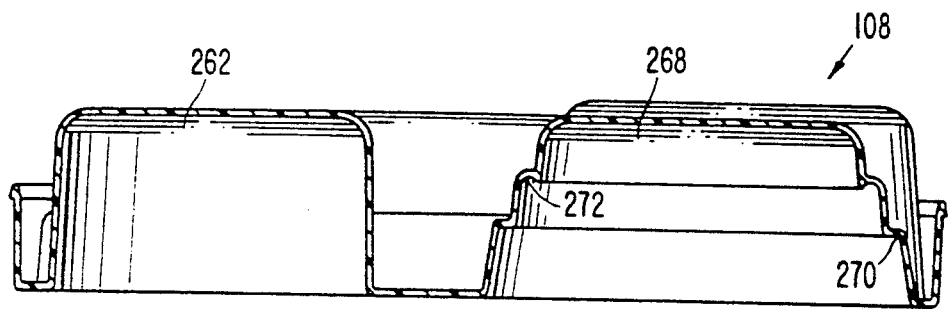
FIG. 27 is a cross-sectional view taken along line 27—27 of FIG. 22.

This twisting of the knob 102 by grasping and rotating the top ridge or rib 214 allows the steel or other metallic insert or plug, as shown at 230 in the bottom view of FIG. 19, to be repositioned angularly about one hundred and eighty degrees from a position close to the opening 104 or 106 in the tray 100. This difference in the position of the metallic plug 230 relative to the hot food dish openings 104 or 106, and thus relative to the pod when the tray is positioned in the cart on the pods, activates a switch in the pod to cause the pod to be turned on to its thermalization or heating state at the desired time. The heating units or pods, for both of the large and small hot plate dishes, can thereby be individually controlled. Thus four conditions are possible for these two pods, namely, hot-hot, hot-cold, cold-hot and cold-cold. Removal of the knob for replacement or cleaning purposes is easy. Looking at the tray 100 from the bottom as in FIG. 14, the knob 102 is twisted so that the cut-out area 200 is in alignment with the projection 204 and when aligned the knob is pushed down through or towards the top of the tray until it pops or falls out.

These switches or knobs 102 give flexibility for easily selecting any of the four above-mentioned conditions for a single tray. Another system of this invention which would provide the same flexibility is to mount the metallic plugs in the cover and provide four different covers each with a different plug arrangement—one for each of the different conditions. Each of the covers would then be differently coded so they could be easily distinguished and selected. One coding scheme would color each of the four covers a different color. Other schemes which would be apparent to those skilled in the art are also within the scope of this invention. This plug-mounted cover embodiment has the advantage that there are no moving parts which can malfunction or fall-out. Unlike the knob embodiment, however, an inventory of the different covers must be maintained.

Figure 28:
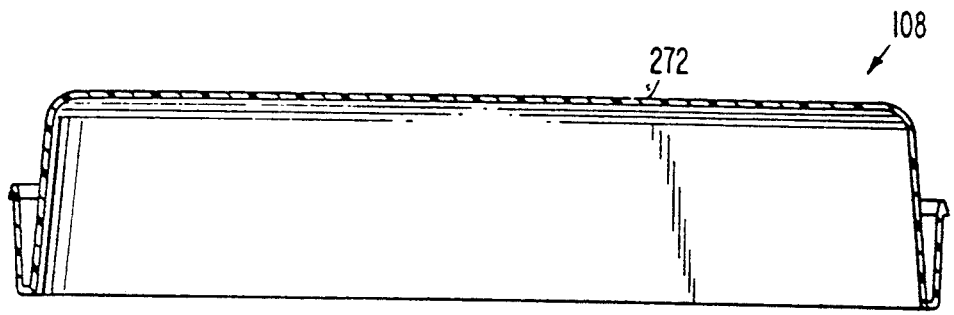
FIG. 28 is a cross-sectional view taken along line 28—28 of FIG. 22.
Figure 29:
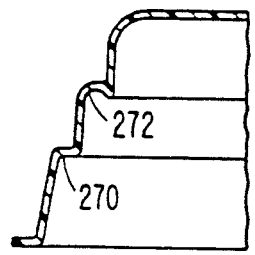
FIG. 29 is a cross-sectional view taken along lines 29—29 of FIG. 22.
Figure 31:
FIG. 31 is a cross-sectional view taken along line 31—31 of FIG. 22.
Figure 30:
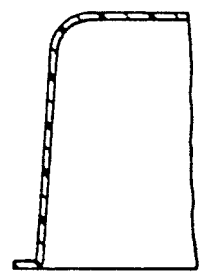
FIG. 30 is a cross-sectional view taken along lines 30—30 of FIG. 22.
Figure 40:
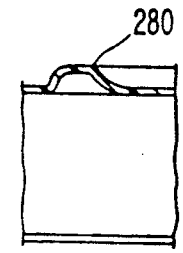
FIG. 40 is a cross-sectional view taken along lines 40—40.
Figure 41:
FIG. 41 is a view taken on line 41—41.

The top cover bottom shell 108 is configured to define a number of downwardly depending domes to cover each of the areas of the tray and its contents. Domes 260 and 262 are provided for hot plate areas 120, 122, respectively, domes 264, 266, and 268 for cold plate support areas 124, 126, and 128, dome 270 for holding area 130 and dome 272 (FIG. 28) for wing area 232. Domes 264, 266 and 268 have a layered wedding cake cross-section as illustrated for example in FIGS. 23, 24, 25 and 29 with two steps 270, 272. This layered cross section provides more insulation for the first step 270 and the second step 272 provides a condensation lip for condensation droplets to drop back into the dish. The dome 260 has only a single step 274, as shown in FIGS. 23 and 26 which defines a drip lip for returning condensation droplets to the food. The other domes have no steps as shown in FIGS. 28 and 30 for example, since these areas contain cold food which does not generate condensation. A small wall 276 illustrated in FIG. 31 helps define a dome for the knobs. The cover top shell 110 has bumps 280 as shown in FIG. 40 so that a tray can nest inside these bumps for transporting. Another cover can also nest here for shipping and storage.

Figure 32:
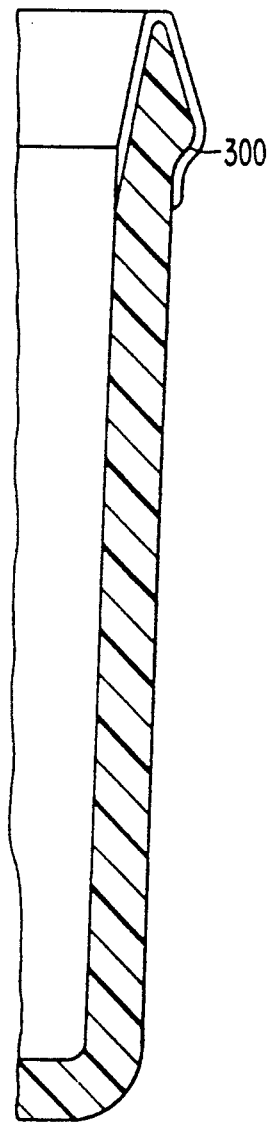
FIG. 32 is an enlarged cross-sectional view taken along line 32—32 of FIG. 22.
Figure 33:
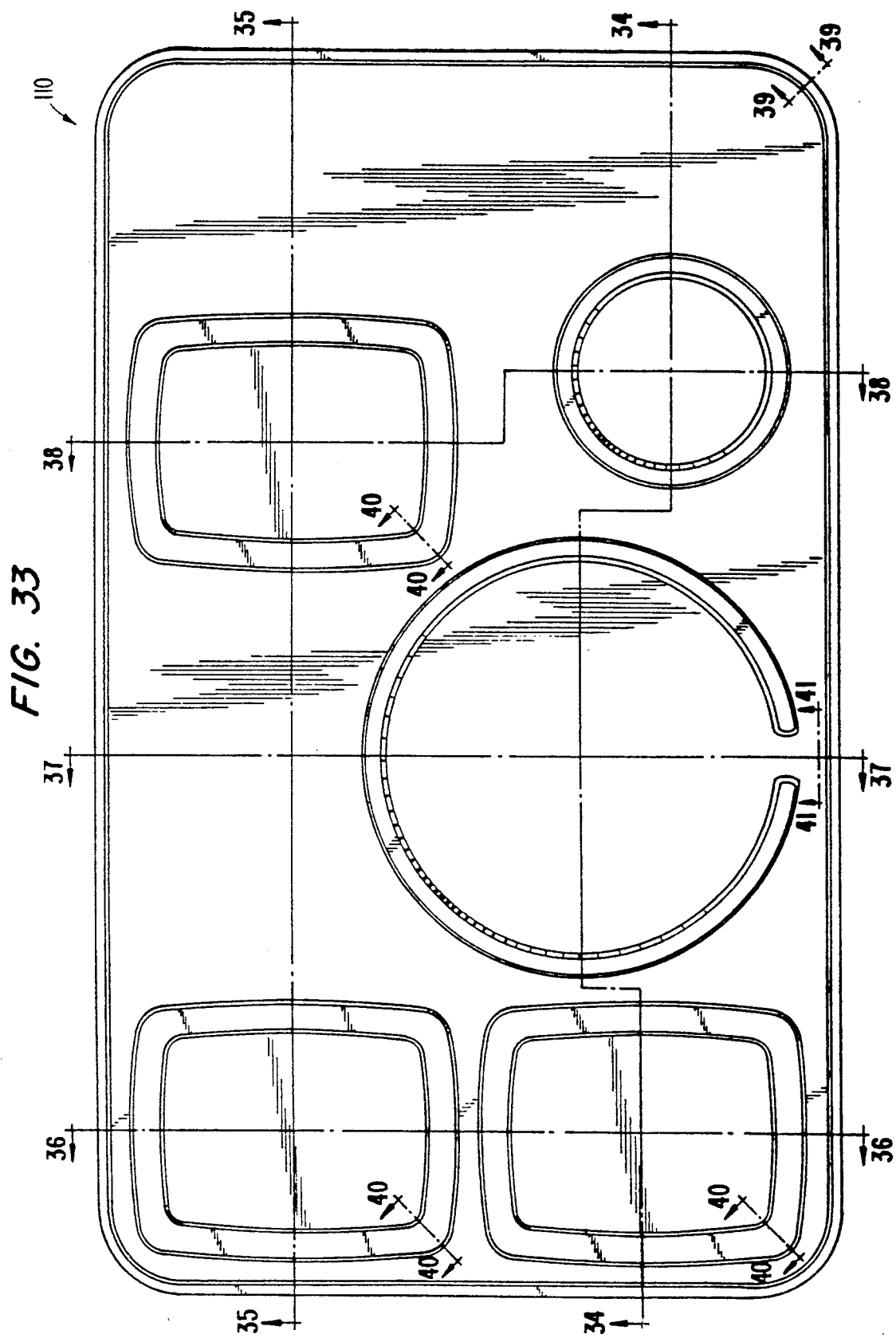
FIG. 33 is a top plan view of the top shell of the cover of the system of FIG. 1 and which is adapted to mate with the bottom shell of FIG. 22.
Figure 34:
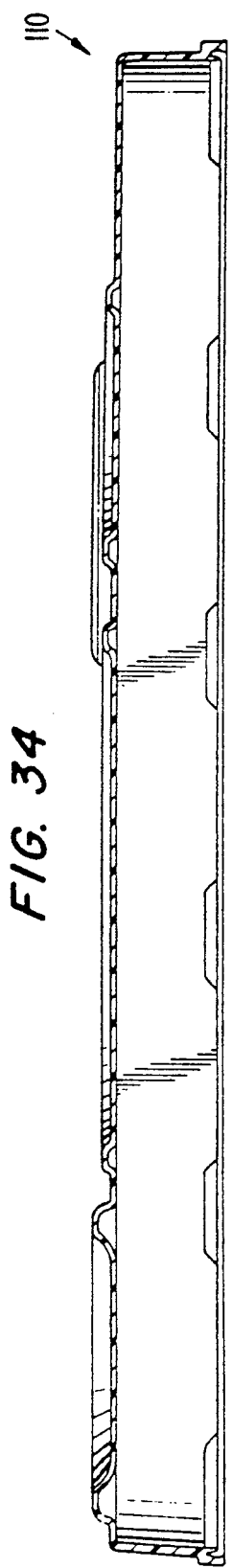
FIG. 34 is a cross-sectional view taken along line 34—34 of FIG. 33.
Figure 35:
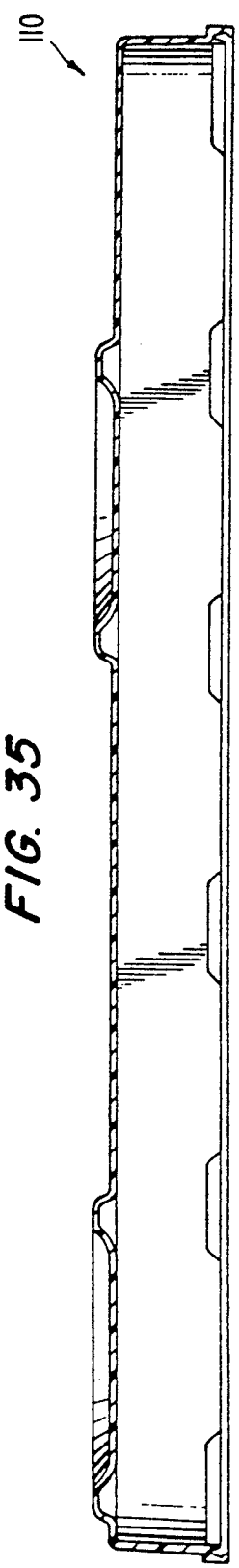
FIG. 35 is a cross-sectional view taken along line 35—35 of FIG. 33.
Figure 37:
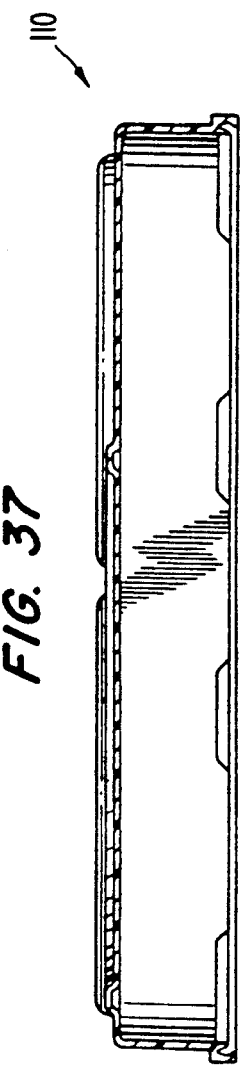
FIG. 37 is a cross-sectional view taken along line 37—37 of FIG. 33.
Figure 36:
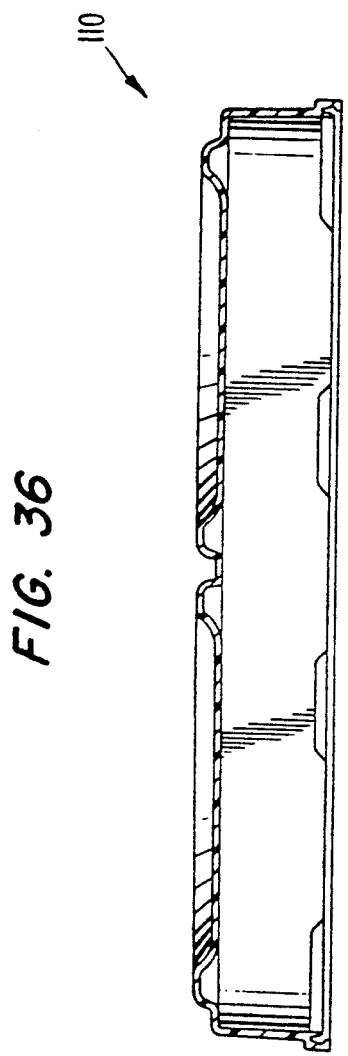
FIG. 36 is a cross-sectional view taken along line 36—36 of FIG. 33.
Figure 38:
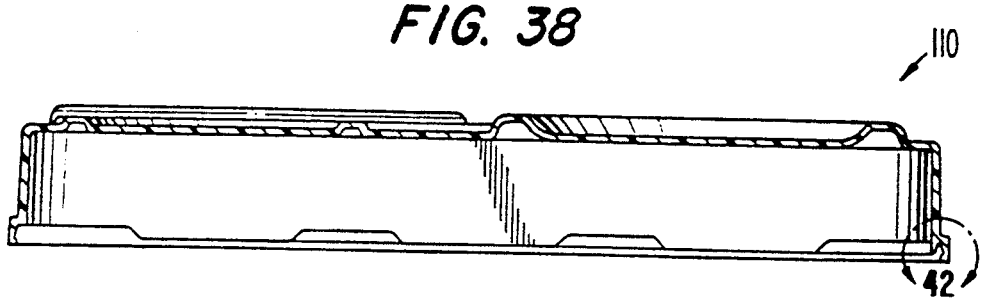
FIG. 38 is a cross-sectional view taken along line 38—38.
Figure 39:
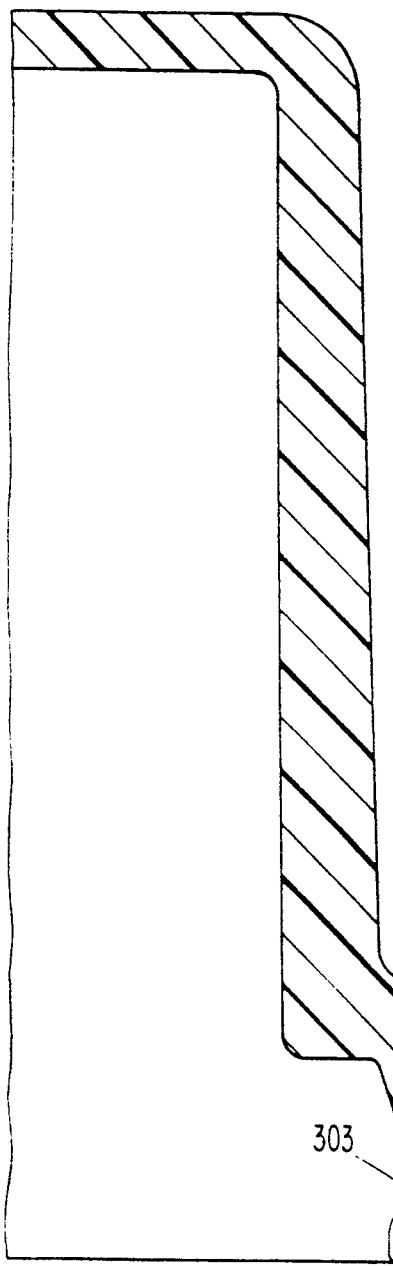
FIG. 39 is an enlarged cross-sectional view taken along line 39—39.
Figure 42:
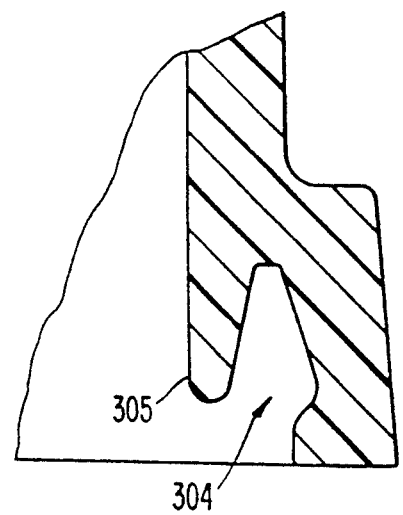
FIG. 42 is an enlarged view taken on line 42 of FIG. 38.

Referring to FIG. 32 the hook end 300 is provided for snapping the bottom shell to the corresponding top shell. FIG. 39 shows an angular nub end 302 for snapping the cover top shell over the bottom shell. The undercut area 303 at the bottom of 302 provides the locking action between the two shells. The catch 304 as best shown in FIG. 42 is provided for the same as FIG. 39 except the internal leg 305 keeps the joint from separating. The end configuration as shown generally at 306 in FIG. 41 has that shape because it must clear the projection on the pod when entering the cart. Thus with shells 108 and 110 joined and foam insulation inserted therebetween an effective cover is formed which individually insulates each of the tray areas and releasably fits or locks onto the tray 100.

Numerous characteristics and advantages of the invention have been described in detail in the foregoing description with reference to the accompanying drawings. However, the disclosure is illustrative only and the invention is not limited to the precise illustrated embodiment. Various changes and modifications may be effected therein by persons skilled in the art without departing from the scope or spirit of the invention.

What is claimed is:

1. A food service and rethermalization tray assembly, comprising:
    a tray having a tray top surface, a hot food dish through-opening in said tray top surface and support means for generally supporting a hot food dish in said through-opening such that the bottom of the dish can be controllably heated by a heating pod beneath said tray and having a magnetic switch; and
    actuator means mounted on said tray generally adjacent to said through-opening for actuating the magnetic switch with said tray in position relative to the heating pod;
    wherein said actuator means is positionable in alternative ON and OFF positions with said tray in position relative to the heating pod.

2. The tray assembly of claim 1 wherein said support means comprises a rim on said tray top surface and disposed about said through-opening.

3. The tray assembly of claim 1 wherein said tray includes an actuator through-hole and said actuator means is positioned in said actuator through-hole.

4. The tray assembly of claim 3 wherein said actuator means comprises a knob fitted into and retained in said actuator through-hole.

5. The tray assembly of claim 1 further comprising said through-opening defining a first through-opening, said actuator means defining a first actuator means, said tray having a second through-opening generally spaced from said first through-opening, and second actuator means, generally independent of said first actuator means, for actuating a different heating pod associated with said second through-opening.

6. The tray assembly of claim 1 wherein said actuator means includes manual adjustment means for adjusting the relative position of said actuator means relative to said magnetic switch.

7. A food service tray assembly, comprising:
    a tray having a plurality of top receiving areas, each for receiving at least one different food item, said tray having an opening and a projection in said opening;
    a turning member having a channel in which said projection rides as said turning member is selectively turned between first and second positions relative to said opening; and
    selector means associated with said member for selecting the desired temperature of at least one food item in at least one said receiving area, depending on which of the first and second positions said turning member is in.

8. The tray assembly of claim 7 wherein said selector means includes a metallic plug in said turning member.

9. The tray assembly of claim 7 wherein said turning member includes abutment means for defining the first and second positions.

10. The tray assembly of claim 7 wherein said turning member includes a top turning rib.

11. A food service process, said process comprising the steps of:
provided a tray having spaced first and second food areas and first and second adjustable actuators selected to and generally in the tray;
manually adjusting the first actuator to a different actuator position;
thereafter, securing insulated cover means to the tray over the first and second food areas; and
positioning the covered tray in a rethermalization cart having first and second heating elements, with the first and second food areas in position relative to the first and second heating elements, and thereby in position for actuation of at least one of the first and second heating elements depending on the actuator positions of the first and second actuators, respectively.

12. The process of claim 11 wherein said securing step secures the insulated cover means to the tray and over the first and second actuators.

13. The process of claim 11 wherein said securing step thermally separates the first and second food areas with a cover divider of the insulated cover means.

14. The process of claim 11 wherein the first actuator comprises a knob and said adjusting step includes turning the knob.

15. The process of claim 11 further comprising, before said securing step, manually adjusting the second actuator to a different actuator position.

16. The process of claim 11 wherein said actuating step includes actuating both the first and second heating elements, thereby heating food in both the first and second food areas.

17. A food service rethermalizing and satelliting process, said process comprising the steps of:
providing a tray having a through-opening, a cold dish area, and an end wing area, a cold dish with cold food thereon in the cold dish area, a hot food dish positioned in the through-opening, rethermalizable chilled food on the hot food dish, and a food service accessory in the wing area;
manually turning an actuating member on the tray to heat the bottom of the hot food dish positioned in the through-opening and thereby rethermalizing the food therein;
after said manually turning step, securing an insulated cover to the tray and protectively covering the cold food, the rethermalizable chilled food, and the food service accessory on the wing area;
thereafter, transporting the covered tray with rethermalized food therein a distance to a new location; and
at the new location, removing the cover from the tray.

18. The process of claim 17 further comprising, thereafter eating the rethermalized food while still at least 140° F. and removing the food service accessory from the wing area.

19. The process of claim 17 wherein said heating includes positioning the hot food dish on a heating pod.

20. The process of claim 17 wherein said transporting is from one building, outdoors to another building.

21. The process of claim 17 wherein said eating step is approximately ten minutes after the composition of said rethermalizing step.

22. The process of claim 17 wherein the cover includes internal dividers and said securing means secures the cover with the dividers between the hot food dish and the cold food dish and thereby insulating one from the other.

23. The process of claim 22 wherein the dividers form a dome over each respective through-opening, cold dish area and end wing area.

24. The process of claim 23 wherein the dome has at least one stepped layer.

25. The process of claim 24 wherein the stepped layer includes first and second steps wherein the second step forms a condensation lip to direct condensation droplets returning to each respective hot food dish and cold food dish.

26. The process of claim 17 wherein the insulated cover includes insulating material in the top and side surfaces thereof.

27. The process of claim 26 wherein the insulating material is generally equally distributed between the top and side surfaces of the insulated cover.

28. The tray assembly of claim 10 wherein said top turning rib is manually operable.

29. A food service and rethermalization tray assembly, comprising:
a tray having a tray top surface, a hot food dish through-opening in said tray top surface and support means for generally supporting a hot food dish in said through-opening such that the bottom of the dish can be controllably heated by a heating pod beneath said tray;
actuator means, mounted on said tray top surface generally adjacent to said through-opening, for actuating a magnetic switch of the heating pod when said tray is in position relative to the heating pod.

30. The tray assembly of claim 29 wherein said support means comprises a rim on said tray top surface and disposed about said through-opening.

31. The tray assembly of claim 29 wherein said tray includes an actuator through-hole and said actuator means is positioned in said actuator through-hole.

32. The tray assembly of claim 31 wherein said actuator means comprises a knob fitted into and retained in said actuator through-hole.

33. The tray assembly of claim 29 further comprising said through-opening defining a first through-opening, said actuator means defining a first actuator means, said tray having a second through-opening generally spaced from said first through-opening, and second actuator means, generally independent of said first actuator means, for actuating a different heating pod associated with said second through-opening.

34. The tray assembly of claim 29 wherein said actuator means includes a manual turn knob.

35. The tray assembly of claim 29 wherein said actuator means is movable between two positions such that the switch in the heating pod is activated to cause the pod to be turned on to a heating state at the desired time.

36. A food service tray assembly, comprising:

a tray having a plurality of top receiving areas, each for receiving at least one different food item, said tray having an opening and a projection in said opening;

a turning member having a channel in which said projection rides as said turning member is selectively turned between first and second positions relative to said opening; and selector means associated with said member for selecting the desired temperature of at least one food item in at least one of said receiving areas, depending on which of the first and second positions said turning member is in.

37. The tray assembly of claim 36 wherein said selector means includes a metallic plug in said turning member.

38. The tray assembly of claim 36 wherein said turning member includes abutment means for defining the first and second positions.

39. The tray assembly of claim 36 wherein said turning member includes a manually operable top turning rib.

40. A rethermalizing and serving tray assembly, comprising:

a tray having a tray top surface and defining means for defining on said tray top surface at least one hot dish through-opening, at least one cold dish recessed area and an end wing area for receiving therein at least one serving article, said tray top surface including at least one actuating member for selectively rethermalizing food in a hot food dish disposed in said hot dish through-opening; and an insulated cover positionable on said tray so as to protectively cover said tray top surface, a hot dish supporting hot food therein and positioned in said hot dish through-opening, a cold dish supporting cold food therein and positioned in said cold dish recessed area, and said end wing area.

41. The tray assembly of claim 40 wherein said hot dish through-opening has through-opening edges such that said hot dish positioned in said through-opening remains in direct contact with said tray when said hot dish is placed on a heating element.

42. The tray assembly of claim 40 wherein said insulated cover has inside downwardly disposed dividers which substantially thermally separate the hot food and the cold food with said insulated cover positioned on said tray.

43. The tray assembly of claim 42 wherein said insulated cover entirely overlies said tray top surface when positioned on said tray.

44. The tray assembly of claim 42 wherein said downwardly disposed dividers substantially thermally separate the hot food, the cold food, and said end wing area.

45. The tray assembly of claim 42 wherein said dividers form a dome over each respective said hot dish through-opening, cold dish area and end wing area.

46. The tray assembly of claim 45 wherein said dome has at least one stepped layer.

47. The tray assembly of claim 46 wherein said stepped layer includes first and second steps, and said second step forms a condensation lip which directs condensation droplets to return to the respective said hot dish and cold dish.

48. The tray assembly of claim 42 wherein said insulated cover includes insulating material disposed in and generally equally distributed between the top and side surfaces thereof.

49. The tray assembly of claim 40 wherein said insulated cover when secured on said tray protectively covers a serving article positioned in said end wing area.

50. The tray assembly of claim 40 wherein said wing area extends the full width of said tray and is disposed entirely on one lateral side end of said tray.

51. The tray assembly of claim 40 wherein said wing area includes a bottom support surface for supporting a food service accessory.

52. The tray assembly of claim 40 wherein said hot dish through-opening is circular in shape.

53. The tray assembly of claim 52 wherein said cold dish recessed area is generally rectangular in shape.

54. The tray assembly of claim 53 wherein said tray includes a plurality of said hot dish through-openings disposed along a front edge of said tray, said end wing area is disposed to the right thereof, a plurality of said cold dish recessed areas are positioned throughout the remainder of said tray, and said front edge of said tray comprises the longer horizontal side of said tray that is adjacent said hot dish through-opening.

55. A food service process, said process comprising the steps of:

providing a tray having spaced first and second food areas;

providing first and second adjustable actuators secured to and generally within the tray;

providing a dish of rethermalizable food in at least one of the first and second food areas;

manually adjusting the first actuator to a first desired actuator position;

thereafter, securing insulated cover means to the tray over the first and second food areas; and positioning the covered tray in a rethermalization cart having first and second heating elements, with the first and second food areas in position relative to the first and second heating elements, and thereby in position for heating by at least one of the first and second heating elements depending on the actuator positions of the first and second actuators, respectively.

56. The process of claim 55 wherein said securing step includes securing the insulated cover means to the tray and over the first and second actuators.

57. The process of claim 55 wherein said securing step thermally separates the first and second food areas with a cover divider of the insulated cover means.

58. The process of claim 55 wherein said first actuator comprises a knob, and said adjusting step includes turning the knob.

59. The process of claim 55 further comprising, before said securing step, manually adjusting the second actuator to a different desired actuator position.

60. The process of claim 55 wherein said adjusting step includes adjusting both the first and second actuators and thereby actuating both the first and second heating elements such that food in both the first and second food areas is heated.

61. A food service rethermalizing and satelliting process, said process comprising the steps of:

providing a tray having a through-opening, a cold dish area, and an end wing area, a cold dish with cold food thereon in the cold dish area, a hot food dish positioned in the through-opening, rethermalizable food on the hot food dish, and a food service accessory in the wing area;

securing an insulated cover to the tray and protectively covering the cold food, the rethermalizable food, and the food service accessory on the wing area;

manually adjusting a heating actuator associated with a heating element;

after said adjusting step, heating on the heating element the bottom of the hot food dish positioned in the through-opening and thereby rethermalizing the food therein;

thereafter, transporting the covered tray with rethermalized food therein a distance to a new location; and at the new location, removing the cover from the tray.

62. The process of claim 61 further comprising, after said cover removing step, removing the food service accessory from the wing area and consuming the rethermalized food while still at least 140° F.

63. The process of claim 61 wherein said heating step includes positioning the hot food dish on the heating element.

64. The process of claim 61 wherein said transporting step is from one building, outdoors to another building.

65. The process of claim 61 wherein the cover includes internal dividers, and said securing step includes securing the cover with the dividers disposed between the hot food dish and the cold food dish and thereby insulating one from the other.

66. The process of claim 65 wherein the dividers form a dome over each respective through-opening, cold dish area and end wing area.

67. The process of claim 66 wherein the dome has at least one stepped layer, and the stepped layer includes first and second steps, said second step forming a condensation lip to direct condensation droplets so that they return to each respective hot food dish and cold food dish.

68. The process of claim 61 wherein the insulated cover includes insulating material generally equally distributed between the top and side surfaces thereof.

69. A food service rethermalizing system, comprising:

a heating pod having a magnetic switch;

a tray movable with respect to said heating pod, said tray having a tray top surface, a hot food dish through-opening in said tray top surface, and support means for generally supporting a hot food dish disposed in said through-opening such that the bottom of the hot food dish can be controllably heated by said heating pod with said tray in position thereabove; and actuator means, mounted on said tray top surface generally adjacent to said through-opening, for actuating said magnetic switch when said tray is in position relative to said heating pod.

70. The process of claim 61 wherein the rethermalizable food is made by cooking the food and thereafter chilling the food.

71. The tray assembly of claim 1 wherein said actuator means is physically maintained in the alternative ON and OFF positions.

72. The tray assembly of claim 1 wherein said actuator means is adjustable relative to said magnetic switch for actuating the heating pod.

73. The tray assembly of claim 1 wherein said actuator means is removably mounted on said tray.

74. The tray assembly of claim 1 wherein said tray includes an actuator through-opening and a projection in said opening, and said actuator means includes a turning member having a channel in which said projection rides as said turning member is selectively turned between the alternative ON and OFF positions.

75. The tray assembly of claim 1 wherein said actuator means includes a manual turn knob rotatable about 180 degrees and the ON and OFF positions of said actuator means are separated by a 180 degree rotation.

* * * * *